(12) United States Patent
Hori

(10) Patent No.: US 8,561,739 B2
(45) Date of Patent: Oct. 22, 2013

(54) MOVABLE GRILLE SHUTTER FOR VEHICLE

(75) Inventor: Kenji Hori, Toyota (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 155 days.

(21) Appl. No.: 13/067,841

(22) Filed: Jun. 29, 2011

(65) Prior Publication Data

US 2012/0012410 A1    Jan. 19, 2012

Related U.S. Application Data

(63) Continuation-in-part of application No. 13/064,499, filed on Mar. 29, 2011, now abandoned.

(30) Foreign Application Priority Data

Jul. 13, 2010   (JP) .................................. 2010-158632
Mar. 31, 2011   (JP) .................................. 2011-079445

(51) Int. Cl.
*B60K 11/00*   (2006.01)

(52) U.S. Cl.
USPC ........................................ 180/68.1; 180/68.2

(58) Field of Classification Search
USPC ...................................... 180/68.6, 68.1, 68.2
See application file for complete search history.

(56) References Cited

U.S. PATENT DOCUMENTS

| 5,490,353 | A  | * | 2/1996 | McLaughlin | ...................... 49/64 |
| 6,854,544 | B2 | * | 2/2005 | Vide | ............................ 180/68.6 |
| 7,498,926 | B2 | * | 3/2009 | Browne et al. | ............... 180/68.1 |
| 7,766,111 | B2 | * | 8/2010 | Guilfoyle et al. | ............ 180/68.1 |
| 8,136,487 | B2 | * | 3/2012 | Bernt et al. | .................. 180/68.1 |
| 8,161,919 | B2 | * | 4/2012 | Klotz et al. | .................. 180/68.1 |
| 8,181,727 | B2 | * | 5/2012 | Ritz et al. | ..................... 180/68.1 |

FOREIGN PATENT DOCUMENTS

| EP | 1 522 448 | 4/2005 |
| JP | 58-139519 | 9/1983 |
| WO | WO 2006/056359 | 6/2006 |

OTHER PUBLICATIONS

Extended European Search Report for EP Appl. No. 11171748.4 dated Oct. 28, 2011.

* cited by examiner

*Primary Examiner* — Hau Phan

(74) *Attorney, Agent, or Firm* — Finnegan, Henderson, Farabow, Garrett & Dunner, LLP

(57) ABSTRACT

A movable grille shutter for a vehicle, which is provided at a grille opening portion through which ambient air is taken into an engine room, includes a first fin, a second fin provided along a lengthwise direction of the first fin in a manner that a predetermined angle is formed between the first fin and the second in a manner that the first fin and the second fin are arranged to match a shape of the grille opening portion. The movable grille shutter for the vehicle also includes a driving source for driving the first fin and the second fin for opening and closing the grille opening portion, and a universal joint provided between the first fin and the second fin for transmitting a driving force from the driving source to the first fin and the second fin.

8 Claims, 11 Drawing Sheets

MOVABLE GRILLE SHUTTER FOR VEHICLE

CROSS REFERENCE TO RELATED APPLICATIONS

This is a continuation-in-part of application Ser. No. 13/064,499, filed Mar. 29, 2011 now abandoned, and claims the right to foreign priority under 35 U.S.C. §119 of Japanese Patent Application 2010-158632, filed Jul. 13, 2010 in Japan, and Japanese Patent Application 2011-079445, filed Mar. 31, 2011, in Japan, all of which are incorporated herein by reference.

TECHNICAL FIELD

This disclosure relates to a movable grille shutter for a vehicle.

BACKGROUND DISCUSSION

According to a known movable grille shutter for a vehicle, in order to prevent poor combustion or a decrease in a combustion efficiency caused by an overcooled radiator within an engine room, an engine, a transmission or the like, a grille opening portion through which ambient air is taken in is operated to be opened or closed. For example, such grille shutter includes a supporting shaft which supports a plurality of fins and is provided at a base frame so as to be freely rotatable in such a way that the fins are connected to each other by an interlocking arm, and the interlocking arm is connected to a link mechanism that is configured by a driving arm, formed so as to include a long through hole, and a pin arranged so as to be inserted into the long through hole. In this configuration, the driving arm is rotated by a driving source such as an actuator in order to operate the fins so as to open or close the grille opening portion (for example a movable grille shutter disclosed in JP58-139519U).

According to the known movable grille shutter for a vehicle disclosed in JP58-139519U, however, the supporting shafts, which are arranged on left and right sides of the vehicle respectively across the driving source, are arranged in such a way that axes of the supporting shafts are coaxial with each other, that is, the axes do not intersect each other. In case that the known movable grille shutter disclosed in JP58-139519U is mounted on a vehicle whose front portion includes a curved surface, a dead space is provided between the fins and the curved surface, which may decrease a flexibility in mounting the movable grille shutter on the vehicle. This may restrict a consideration for an aerodynamic performance of the vehicle at a design phase of a vehicle body.

A need thus exists for a movable grille shutter for a vehicle, which is not susceptible to the drawback mentioned above.

SUMMARY

A movable grille shutter for a vehicle, which is provided at a grille opening portion through which ambient air is taken into an engine room, includes a first fin, a second fin provided along a lengthwise direction of the first fin in a manner that a predetermined angle is formed between the first fin and the second in a manner that the first fin and the second fin are arranged to match a shape of the grille opening portion. The movable grille shutter for the vehicle also includes a driving source for driving the first fin and the second fin for opening and closing the grille opening portion, and a universal joint provided between the first fin and the second fin for transmitting a driving force from the driving source to the first fin and the second fin.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

A first embodiment of this disclosure will be explained with reference to the attached drawings. As used herein, the terms "a front-rear direction", "a lateral direction", "a vertical direction (an up-down direction)" and derivatives thereof refer to the directions relative to the vehicle.

Figure 1:
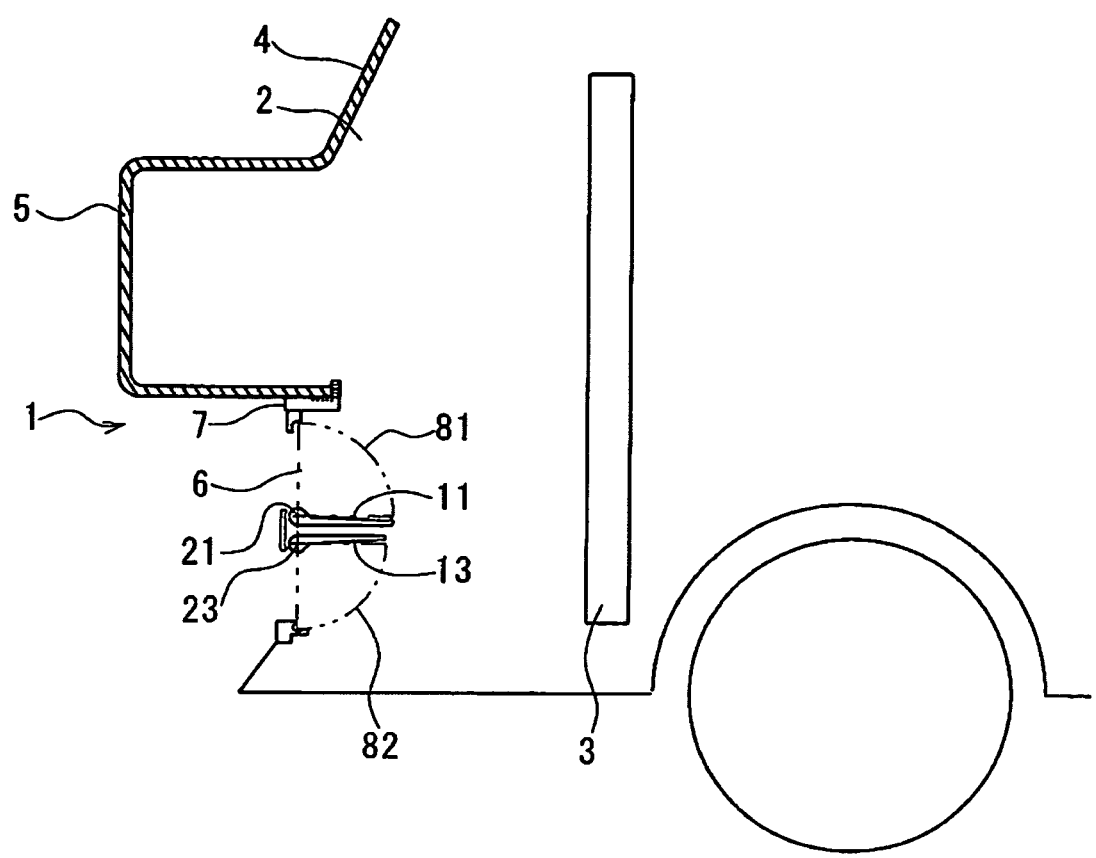
FIG. 1 is a schematic view for indicating a manner of providing a grille shutter related to a first embodiment disclosed here in an engine room.

As shown in FIG. 1, in an engine room 2, a radiator 3 for cooling an engine coolant is arranged so as to be attached to a vehicle body 4. A grille opening portion 6 is formed at a lower front of the radiator 3 in the vehicle front-rear direction, below a bumper 5. A grille shutter 1 (i.e., a movable grille shutter for a vehicle) is provided at the grille opening portion 6.

Figure 2:
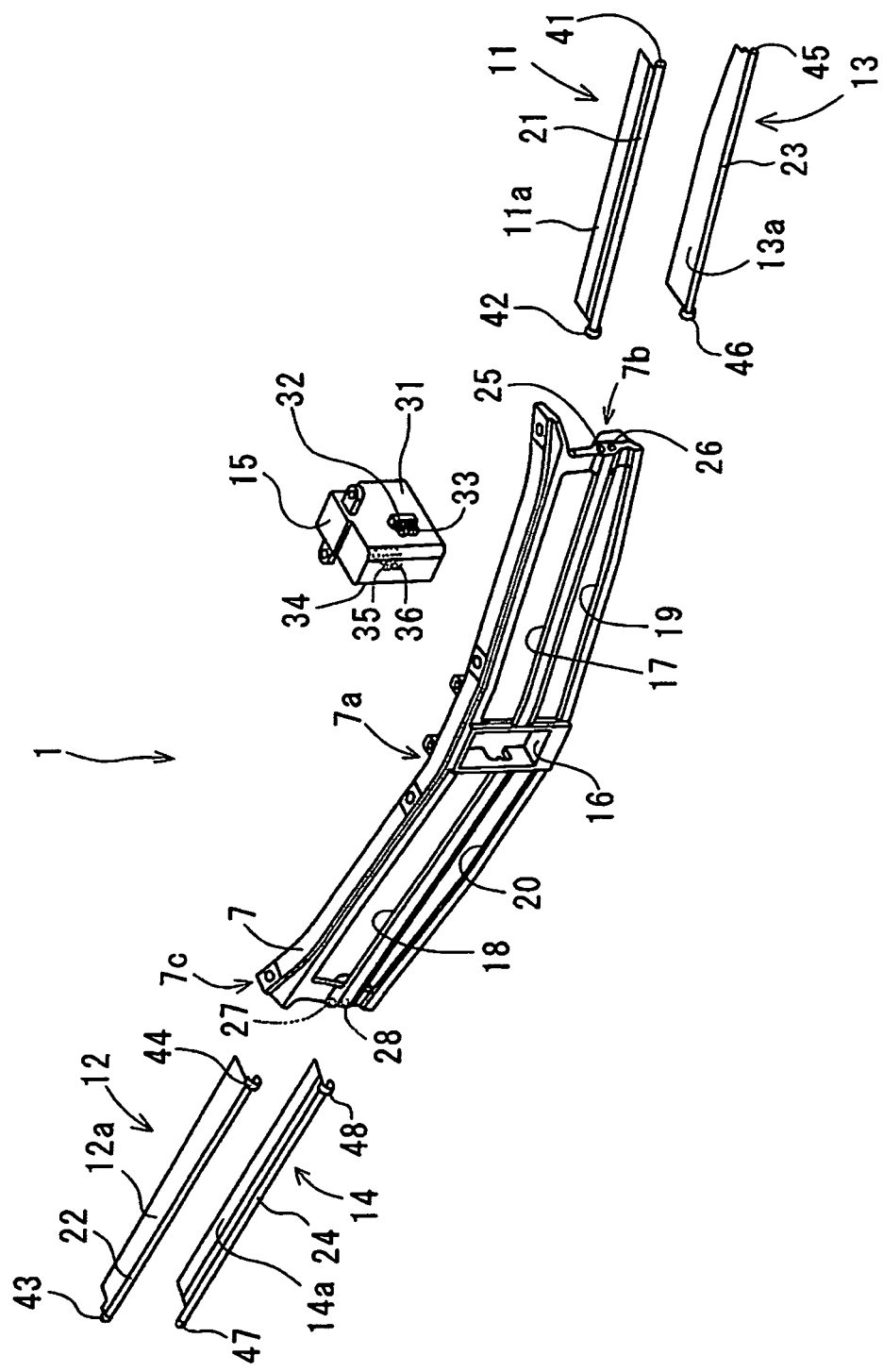
FIG. 2 is an exploded perspective view of an entire configuration of the grille shutter related to the first embodiment.

As shown in FIGS. 1 and 2, the grille shutter 1 includes a base frame 7 provided at the grille opening portion 6, an actuator 15 (i.e., a driving source) and plural fins, for example, four fins in this embodiment, each attached to the base frame 7. The four fins refer to a first fin 11, a second fin 12, a third fin 13 and a fourth fin 14. As shown in FIG. 2, the base frame 7 (i.e., a base frame) is formed into a long shape extending in the lateral direction when the base frame 7 is mounted on the vehicle. The base frame 7 includes a laterally intermediate portion 7a, and laterally end portions 7b, 7c. The base frame 7 is formed to have a curved shape so that, when the base frame 7 is mounted on the vehicle, the laterally intermediate portion 7a is positioned foremost and the laterally end portions 7b, 7c are positioned offset rearward relative to the laterally intermediate portion 7a. The laterally intermediate portion 7a includes an actuator attaching portion 16 to which the actuator 15 is attached. Thus, the actuator 15 is positioned between the first fin 11 and the second fin 12, that is, between the third fin 13 and the fourth fin 14. Fin attachment portions 17, 18, 19, 20 are formed at the base frame 7 so as to be positioned left or right to the actuator attaching portion 16. The first fin 11, the second fin 12, the third fin 13 and the fourth fin 14 are attached to the fin attachment portions 17, 18, 19, 20, respectively. In this embodiment, the fin attachment portions 17, 19 are provided to the right of the actuator attaching portion 16 when viewed in FIG. 2 in a manner that the fin attachment portion 17 is positioned above the fin attachment portion 19, and the fin attachment portions 18, 20 are provided to the left of the actuator mounting portion 6 when viewed in FIG. 2 in a manner that the fin attachment portion 18 is positioned above the fin attachment portion 20.

The first fin 11 includes a first supporting shaft 21 formed into a linear shape and is mounted to the base frame 7 so as to extend in the lateral direction of the vehicle. The first fin 11 further includes a fin portion 11a formed integrally to the first supporting shaft 21. The second fin 12 includes a second supporting shaft 22 formed into the linear shape and is mounted to the base frame 7 so as to extend in the lateral direction of the vehicle. The second fin 12 further includes a fin portion 12a formed integrally to the second supporting shaft 22. The third fin 13 includes a third supporting shaft 23 formed into the linear shape and is mounted to the base frame 7 so as to extend in the lateral direction of the vehicle and a fin portion 13a formed integrally to the third supporting shaft 23. The fourth fin 14 includes a fourth supporting shaft 24 formed into the linear shape and is mounted to the base frame 7 so as to extend in the lateral direction of the vehicle and a fin portion 14a formed integrally to the fourth supporting shaft 24. In this embodiment, the first fin 11 and the third fin 13 both serve as "a first fin". The second fin 12 and the fourth fin 14 both serve as "a second fin". The first supporting shaft 21 and the third supporting shaft 23 serve as "a first supporting shaft". The second supporting shaft 22 and the fourth supporting shaft 24 serve as "a second supporting shaft".

As shown in FIG. 2, a first fin shaft support portion 25 (i.e., a first shaft support portion) and a third fin shaft support portion 26 (i.e., the first shaft support portion) are provided at the laterally end portion 7b of the base frame 7, and a second fin shaft support portion 27 (i.e., a second shaft support portion) and a fourth fin support portion 28 (i.e., the second shaft support portion) are provided at the laterally end portion 7c of the base frame 7. A first output shaft 32 (i.e., a first output shaft) and a third output shaft 33 (i.e., the first output shaft) are provided at a right side surface 31 of the actuator 15, and a second output shaft 35 (i.e., a second output shaft) and a fourth output shaft 36 (i.e., the second output shaft) are provided at a left side surface 34 of the actuator 15.

The first supporting shaft 21 of the first fin 11 includes a first shaft end portion 41 and a first shaft base portion 42 which are positioned at end portions of the first supporting shaft 21 respectively. The first shaft end portion 41 is fitted to and supported by the first fin shaft support portion 25, and the first shaft base portion 42 is fitted to and supported by the first output shaft 32. The second supporting shaft 22 of the second fin 12 includes a second shaft end portion 43 and a second shaft base portion 44 which are positioned at end portions of the second supporting shaft 22 respectively. The second shaft end portion 43 is fitted to and supported by the second fin shaft support portion 27, and the second shaft base portion 44 is fitted and supported by the second output shaft 35. The third supporting shaft 23 of the third fin 13 includes a third shaft end portion 45 and a third shaft base portion 46 which are positioned at end portions of the third supporting shaft 23 respectively. The third shaft end portion 45 is fitted to and supported by the third fin shaft support portion 26, and the third shaft base portion 46 is fitted to and supported by the third output shaft 33. The fourth supporting shaft 24 of the second fin 12 includes a fourth shaft end portion 47 and a fourth shaft base portion 48 which are positioned at end portions of the fourth supporting shaft 24 respectively. The fourth shaft end portion 47 is fitted to and supported by the fourth fin shaft support portion 28, and the fourth shaft base portion 48 is fitted to and supported by the fourth output shaft 36. As shown in FIG. 1, for example, the first fin 11 and the third fin 13 are arranged in such a way that the first fin 11 faces the third fin 13, and in such a way that the first fin 11 and the third fin 13 open and close the grille opening portion 6 in a symmetrical manner in the vertical direction. The second fin 12 and the fourth fin 14 are arranged in such a way that the second fin 12 faces the fourth fin 14, and in such a way that the second fin 12 and the fourth fin 14 open and close the grille opening portion 6 in the symmetrical manner in the vertical direction.

Figure 3:
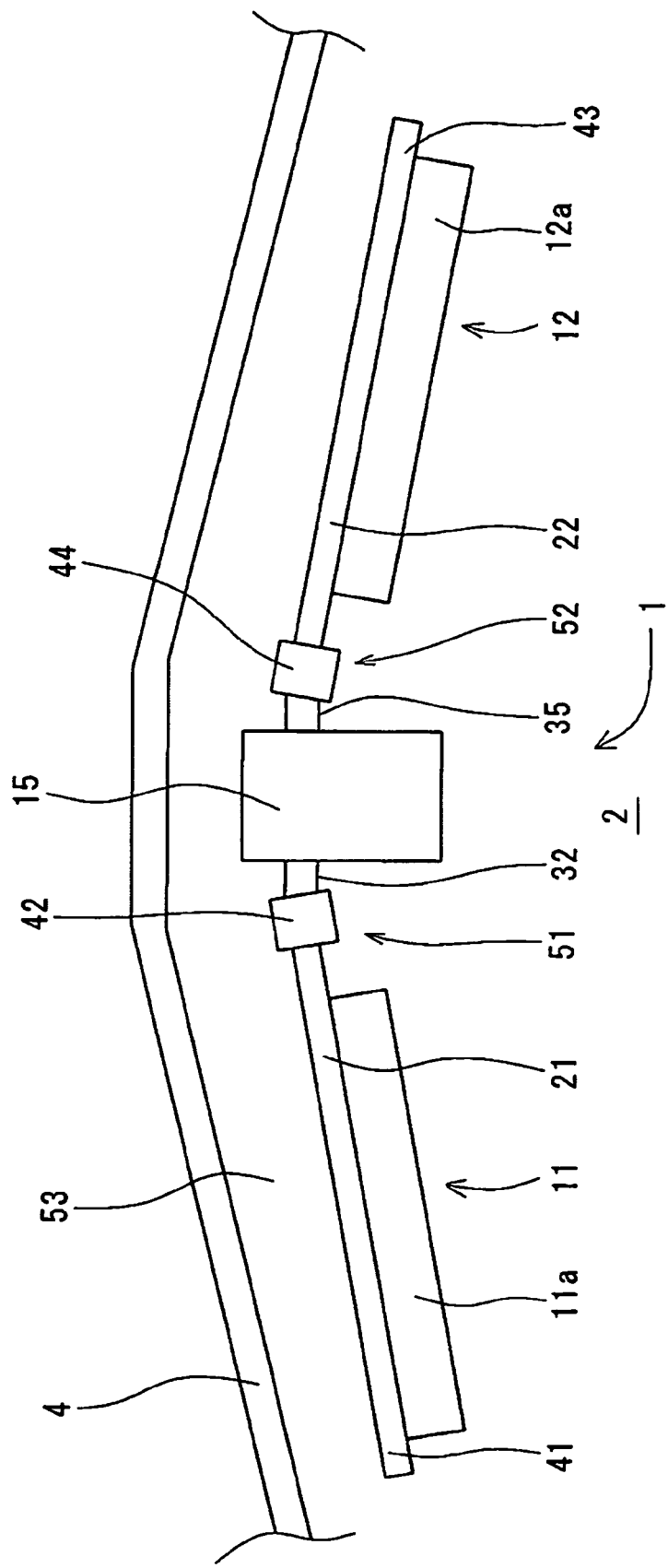
FIG. 3 is an explanation diagram illustrating a plane view of the grille shutter related to the first embodiment.

As shown in FIG. 3, the first output shaft 32 of the actuator 15 is fitted to the first shaft base portion 42 of the first fin 11 in such a way that an axial direction of the first output shaft 32 intersects with an axial direction of the first supporting shaft 21, thereby constituting a first universal joint 51 (i.e., a universal joint). The second output shaft 35 of the actuator 15 is fitted to the second shaft base end portion 44 of the second fin 12 in such a way that an axial direction of the first output shaft 35 intersects with an axial direction of the second supporting shaft 22 in such a way that an axial direction of the second output shaft 35 intersects with an axial direction of the second supporting shaft 22, thereby constituting a second universal joint 52 (i.e., the universal joint). The first shaft end portion 41 supported by the first fin shaft support portion 25 is positioned offset rearward relative to an axis of the first output shaft 32 and the second shaft end portion 43 supported by the second fin shaft support portion 27 is positioned to be offset rearward relative to an axis of the second output shaft 35. As a result, the first fin 11, the second fin 12 and the actuator 15 interposed between the first fin 11 and the second fin 12 are arranged in a substantially inverted V-shaped configuration (when viewed in FIG. 3) so as to follow or match a shape of the vehicle body 4. The grille shutter 1, in a form of an assembly as explained above, is installed inside the engine room 2 while leaving a gap 53 between the grille shutter 1 and the vehicle body.

Figure 4:
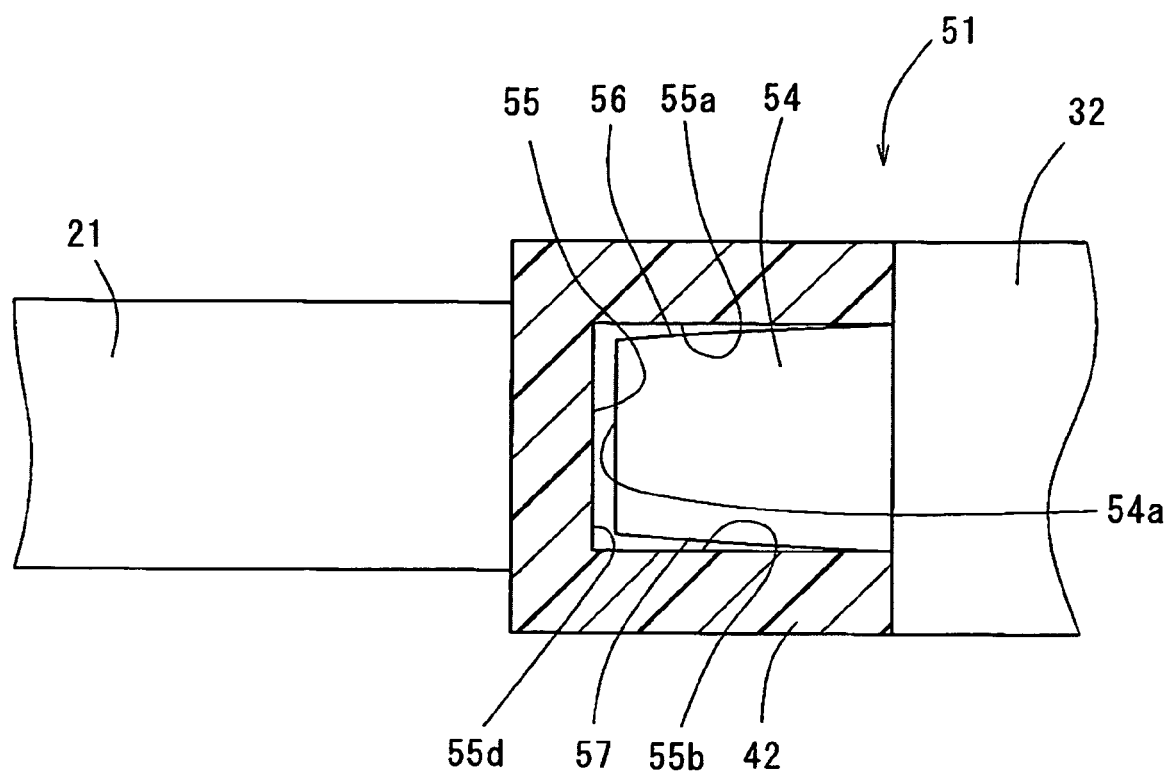
FIG. 4 is a local sectional view of a first universal joint related to the first embodiment, which is viewed from a front direction of a vehicle.
Figure 5:
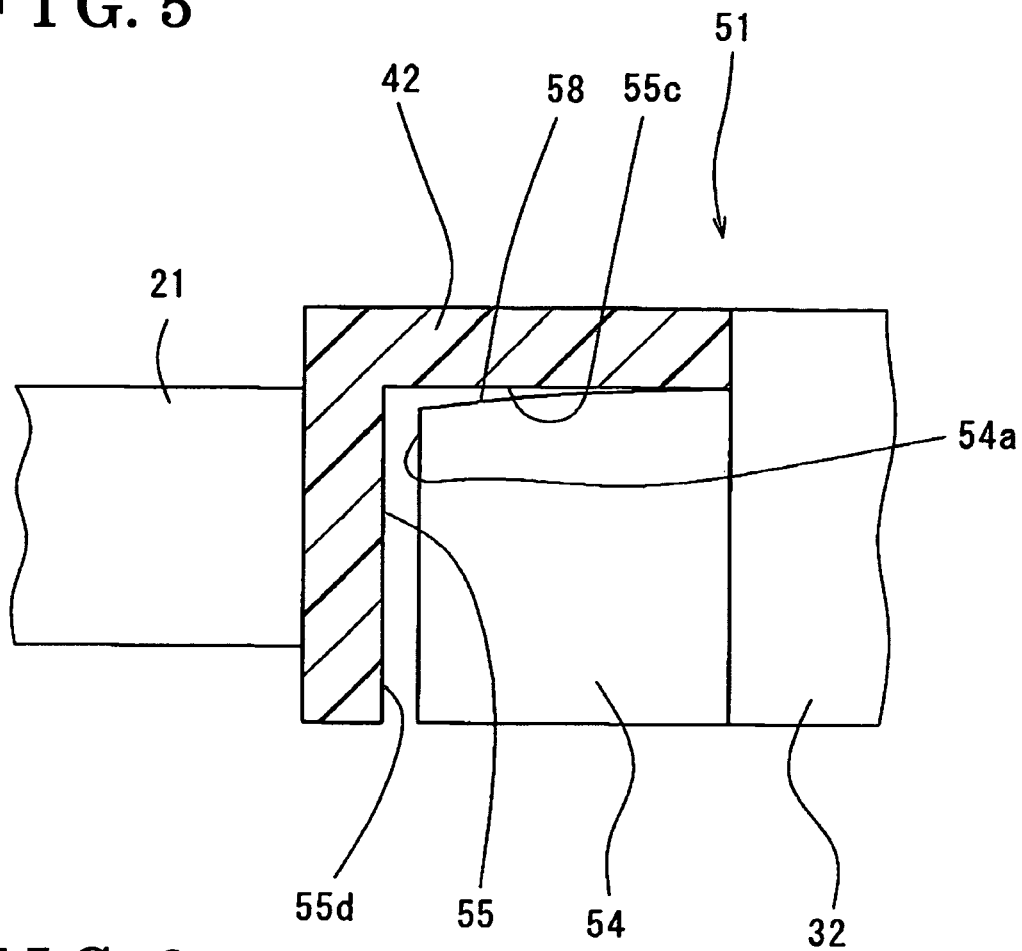
FIG. 5 is a local sectional view of the first universal joint related to the first embodiment, which is viewed from an upper direction of the vehicle.
Figure 6:
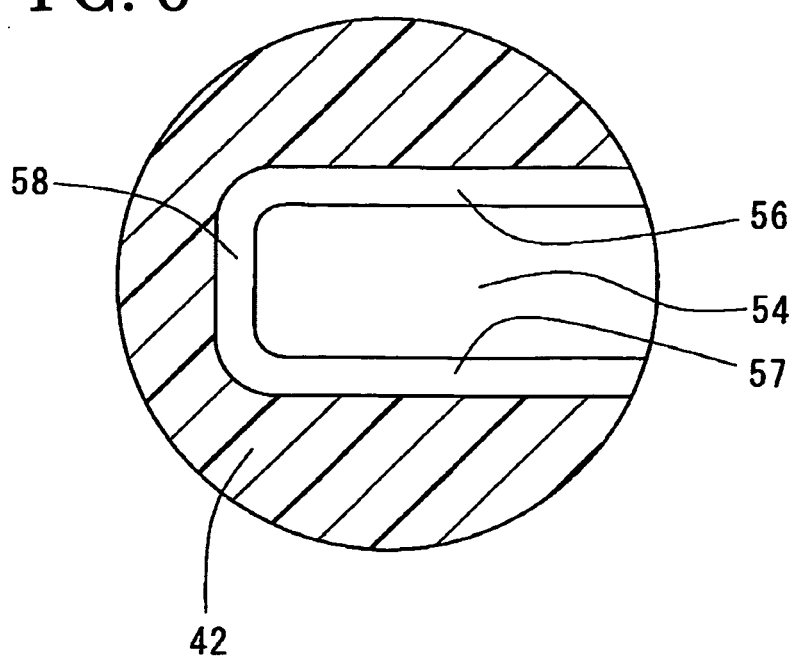
FIG. 6 is a local sectional view of the first universal joint related to the first embodiment, which is viewed from a lateral direction of the vehicle.

The second universal joint 52, a third universal joint and a fourth universal joint each includes the identical configuration to that of the first universal joint 51, therefore an explanation thereof will be omitted. At a distal end of the first output shaft 32, a first quasi-ellipse protruding portion 54 (i.e., a protruding portion) is formed. The first quasi-ellipse protruding portion 54 is fitted to a first recessed portion 55 (i.e., a recessed portion) formed at the first shaft base portion 42 and supports the first shaft support portion 21 whose axial direction intersects with the axial direction of the first output shaft 32. That is, the first quasi-ellipse protruding portion 54 is formed at one end of the first output shaft 32, and the first recessed portion 55 is formed at one end of the first supporting shaft 21. The first quasi-ellipse protruding portion 54 is formed with a first upper surface 56 (i.e., a crowned surface), a first lower surface 57 (i.e., the crowned surface) and a first front surface 58 (i.e., the crowned surface), and thus the first quasi-ellipse protruding portion 54 is formed so as to have less thickness toward an end portion thereof. As shown in FIGS. 4 and 5, the first recessed portion 55 includes a first wall surface 55a, a second wall surface 55b and a third wall surface 55c, each of which are formed into a plane surface. The first wall surface 55a faces the first upper surface 56, the second wall surface 55b faces the first lower wall surface 57, and the third wall surface 55c faces the first front surface 58 when the first quasi-ellipse protruding portion 54 is fitted to the first recessed portion 55. An inner surface 55d of the first recessed portion 55 is defined so as to allow a clearance between an end surface 54a of the first quasi-ellipse protruding portion 54 and the inner surface 55d when the first quasi-ellipse protruding portion 54 is fitted to the first recessed portion 55. Accordingly, clearances are provided between the first upper surface 56 and the first wall surface 55a, between the first lower surface 57 and the second wall surface 55b, and between the first front surface 58 and the third wall surface 55c respectively. The clearances allow the first supporting shaft 21 to be mounted on the vehicle body 4 in a tilted state relative to the first output shaft 32 so that a shape of the grille shutter 1 follows or matches the shape of the vehicle body 4. Thus, the first universal joint 51 is configured by the first quasi-ellipse protruding portion 54 and the first recessed portion 55. Therefore, the maximum diameter of the first universal joint 51 equals to an outer diameter of the first shaft base portion 42. In the first embodiment as shown in FIG. 4, the first quasi-ellipse protruding portion 54 includes a quasi-ellipse configuration, however, the recessed portion 55 may include the quasi-ellipse configuration.

Figure 7:
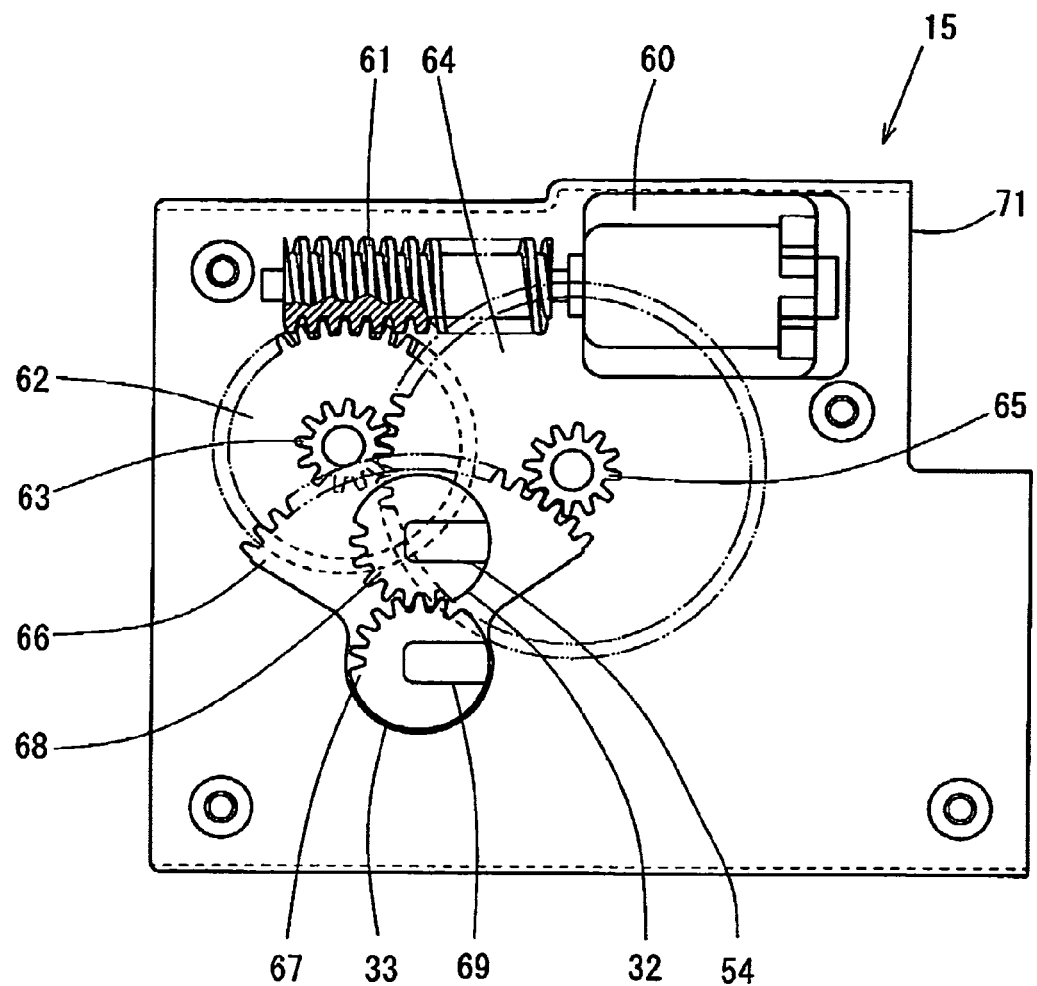
FIG. 7 is an explanation diagram of an inner configuration of an actuator related to the first embodiment.

As shown in FIG. 7, a worm gear 61 is provided at an output shaft of a motor 60 (i.e., a motor) and engages with a worm wheel 62. A first pinion 63 is formed coaxially and integrally with the worm wheel 62, and the first pinion 63 engages with a gear 64. A second pinion 65 is formed coaxially and integrally with the gear 64, and the second pinion 65 engages with a sector gear 66. A second output gear 67 is formed coaxially and integrally with the sector gear 66, and the second output gear 67 engages with a first output gear 68. Two of the first output gears 68, 68 are provided in such a way that the worm wheel 62, the gear 64, and the sector gear 66 are sandwiched therebetween in the axial direction thereof. The first output gears 68, 68 are formed integrally with the first output shaft 32 of the motor 60 and integrally with the second output shaft 35 of the motor 60 respectively. The first quasi-ellipse protruding portion 54 is formed at the distal end of the first output shaft 32 and a second quasi-ellipse protruding portion is formed at a distal end portion of the second output shaft 35. The third output shaft 33 of the motor 60 is formed integrally with the fourth output shaft 36 of the motor 60 in a manner that the second output gear 67 and the sector gear 66 are sandwiched by the third output shaft 33 and the fourth output shaft 36. A third quasi-ellipse protruding portion 69 (i.e., the protruding portion) is formed at a distal end portion of the third output shaft 33 and a fourth quasi-ellipse protruding portion is formed at a distal end portion of the fourth output shaft 36. Due to the above-described structure, the first supporting shaft 21 and the second supporting shaft 22 are driven in synchronization with each other.

The motor 60, the worm gear 61, the worm wheel 62, the first pinion 63, the gear 64, the second pinion 65, the sector gear 66, the second output gear 67 and the first output gear 68 are housed in a housing 71, thereby configuring the actuator 15.

A driving force generated at the motor 60 is transmitted to and rotates the second output gear 67 via the worm gear 61, the worm wheel 62, the first pinion 63, the gear 64, the second pinion 65 and the sector gear 66. The driving force transmitted to the second output gear 67 is further transmitted to and rotates the first output gear 68 in a direction opposite to a direction in which the second output gear 67 rotates. The rotations of the first output gears 68, 68 cause the first output shaft 32 and the second output shaft 35 to rotate in one direction, and the rotations of the second output gears 67, 67 cause the third output shaft 33 and the fourth output shaft 36 to rotate in the other direction.

As explained above, the first quasi-ellipse protruding portion 54 of the first output shaft 32 is configured by the first upper surface 56, the first lower surface 57 and the front surface 58 each including the crowned surface that is contactable with the first recessed portion 55, therefore the first output shaft 32 is fitted to the first support shaft 21 in such a way that the relative tilt therebetween is allowed. The first supporting shaft 21, whose axial direction intersects with the axial direction of the output shaft 32, rotates in synchronization with the first output shaft 32 while absorbing an angle of tilting of the first supporting shaft 21 relative to the output shaft 32, thereby driving the first fin 11 so as to open or close the grille opening portion 6. In a similar manner to that explained above, the second output shaft 35, the third output shaft 33 and the fourth output shaft 36 rotate, thereby driving the second fin 12, the third fin 13 and the fourth fin 14 so as to open or close the grille opening portion 6 respectively. As shown in FIG. 1, a locus 81 determined by a top end of the first fin 11 and a locus 82 determined by a top end of the third fin 13 are symmetric to each other in the vertical direction. In a similar manner to that explained above, the locus 81 determined by a top end of the second fin 12 and the locus 82 determined by a top end of the fourth fin 14 are symmetric to each other in the vertical direction. The first fin 11 and the third fin 13 are operated in synchronization with each other so as to open or close the grille opening portion 6 in a manner where the top end of the first fin 11 follows the locus 81 that is symmetrical to the locus 82 determined by the top end of the third fin 13. When the first fin 11 and the third fin 13 are operated so as to fully open the grille opening portion, the first fin 11 is positioned so as to face the third fin 13. In a similar manner, the second fin 12 and the fourth fin 14 are operated in synchronization with each other so as to open or close the grille opening portion 6 in a manner where the top end of the second fin 12 follows the locus 81 that is symmetrical to the locus 82 determined by the top end of the fourth fin 14. When the second fin 12 and the fourth fin 14 are operated so as to fully open the grille opening portion, the second fin 12 is positioned so as to face the fourth fin 14.

According to the first embodiment, the first supporting shaft 21 is fitted to the first output shaft 32 in a manner that the relative tilt therebetween is allowed. The second supporting shaft 22 is fitted to the second output shaft 35 in a manner that the relative tilt therebetween is allowed. Thus, the first fin 11 and the second fin 12 are arranged so as to follow or match the shape of the vehicle body, which improves a degree of freedom in the mounting of the grille shutter 1 on the vehicle. In addition, by mounting the grille shutter 1 on the vehicle, overcooling of the radiator, the engine, the transmission or the like is restricted and an air resistance is reduced when the vehicle is running at a high speed, which improves a combustion efficiency of the vehicle. At the same time, the gap 53, which is a dead space, is reduced and thus a space that may be used for a purpose of a pedestrian protection or as a crushable zone is easily ensured, which improves safety. In addition, as the degree of freedom in the mounting of the grille shutter 1 improves, the vehicle body is designed with consideration of the aerodynamic performance, which enhances the aerodynamic performance of the vehicle.

The first and second universal joints 51, 52 each allows the relative tilt of the first output shaft 32 and the first supporting shaft 21 and the relative tilt of the second output shaft 35 and the second supporting shaft 22 respectively, and thus there is no need for using a bevel gear or a skew gear having a different specification in accordance with the shape of the vehicle body in order to change directions of the rotations of the first output shaft 32 and the second output shaft 35. Therefore, the identical actuator 15, the first fin 11, the second fin 12 and other components may be used for various vehicle types each having a different body shape. In addition, there is no need to arrange the first supporting shaft 21 and the first output shaft 33 coaxially with other, or the second supporting shaft 22 and second output shaft 35 coaxially with each other, which improves a design flexibility of the vehicle body. In addition, the first universal joint 51 and the second universal joint 52 allow a misalignment between the rotation axes of the first supporting shaft 21 and the first output shaft 32, and between the second supporting shaft 22 and second output shaft 35 respectively. Therefore, a machining accuracy expected from the base frame 7, the first and second fins 11, 12 and the like is alleviated. The above-explained effects are similarly achieved for the third and fourth fins 13, 14.

The first quasi-ellipse protruding portion 54 is configured by the first upper surface 56, the first lower surface 57 and the first front surface 58 each serving as the crowned surface so that an intersection angle between the rotation axis of the first supporting shaft 21 and the rotation axis of the first output shaft 32 is absorbed. Consequently, no other parts or components may be needed for configuring a mechanism for allowing the relative tilt, which makes a configuration of the first universal joint 51 simple by reducing the number of parts and components to be used. In addition, the maximum diameter of the first universal joint 51 equals to the outer diameter of the first shaft base portion 42, which achieves the first universal joint 51 having a small diameter. The above-explained effects are similarly achieved for the second universal joint 52, the third universal joint and the fourth universal joint. As a result, a distance between the axis of the first output shaft 32 and an axis of the third output shaft 33, and a distance between the axis of the second output shaft 35 and an axis of the fourth output shaft 36 are reduced, thereby reducing a size of the grille shutter 1.

The first, second, third and fourth fins 11, 12, 13, 14 are driven to move by the motor 60 so as to open or close the grille opening portion 6, and thus the actuator 15 having a small size is achieved. Further, a control performance of the grille shutter 1 improves, allowing the grille opening portion 6 to be opened or closed by means of a remote control operation from a vehicle cabin. In addition, a general-purpose motor that is applicable to various vehicles of different types may be used as the motor 60, which reduces a cost of the grille shutter 1. In addition, by monitoring a coolant water temperature, a lubricant temperature, an engine load, a vehicle speed or the like, the control of the grille shutter 1 may be associated with a control of opening or closing of coolant pumps or of thermo valves, or with a temperature control of an air conditioner. Accordingly a cooling system is integrally controlled, which allows an integrated heat management of the vehicle, and thus a fuel efficiency improves.

The grille shutter 1 is provided in the assembled form by attaching the actuator 15, and the first, second, third and fourth fins 11, 12, 13, 14 to the actuator attaching portion 16, and to the fin attachment portions 17, 18, 19, 20 of the base frame 7 respectively. Thus, a high assembly performance on the vehicle is achieved.

The first fin shaft support portion 25 and the second fin shaft support portion 27 are arranged to be offset rearward relative to the axis of the first output shaft 32 and the axis of the second output shaft 35 respectively. Accordingly, the first fin 11 and the second fin 12 are arranged to be offset rearward so as to form a bent shape, that is, the first fin 11 and the second fin 12 are offset by a distance that corresponds to a distance by which the first fin shaft supporting portion 25 and the second fin shaft supporting portion 27 are offset. Therefore, the grille shutter 1 is mounted on the vehicle in a desired direction so that the grille shutter 1 follows or matches the shape of the vehicle body.

According to the universal joints of the grille shutter of the first embodiment, the quasi-ellipse protruding portion is formed at the distal end of each output shaft and the recessed portion is formed at the distal end of each supporting shaft. However, the recessed portion may be formed at the distal end of each output shaft and the quasi-ellipse protruding portion may be formed at the distal end of each supporting shaft. In addition, the recessed portion may include the crowned surfaces that are curved to define a recessed shape. Instead of the universal joint configured by the protrusion and the recess which fit in each other, a spline joint having the crowned surface may be used. Alternatively, the universal joint may be configured by, for example, a bellows-type flexible tube or an elastic body including a rubber, a spring or the like. Alternatively, a cross joint, a ball joint or the like may be used.

The grille shutter according to the first embodiment includes the four fins, two of which are arranged symmetrically with each other in the lateral direction and the other two of which are arranged symmetrically with each other in the vertical direction. However, the grille shutter may include, for example, two or six fins. In addition, the fins may be arranged asymmetrically with each other in the lateral or vertical direction. In addition, the fin may be positioned to be offset in any other direction than the rearward direction according to the shape of the vehicle body. In addition, the drive source may be a fluid pressure piston or other drive source instead of the motor. Alternatively, the grille shutter may be manually operated. In addition, the grille shutter may include a link mechanism, a cam mechanism, a screw mechanism or other mechanisms as a power transmission mechanism instead of the gears.

According to the first embodiment, the grille shutter is used for opening or closing the grille opening portion for taking ambient air into the radiator of an engine-powered vehicle. The grille shutter, however, may be used for opening or closing a cooling air inlet for a heat source including a motor generator, inverter, a battery accumulator, a fuel battery or the like which are mounted on an electric vehicle. Alternatively, the grille shutter may be used for opening or closing the cooling air inlet for the heat source including an exhaust pipe, a brake or the like.

Figure 8:
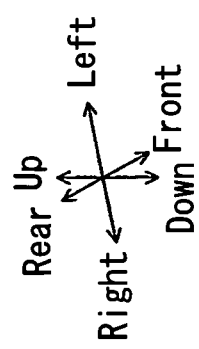
FIG. 8 is a perspective view of a grille shutter related to a second embodiment disclosed here.
Figure 8:
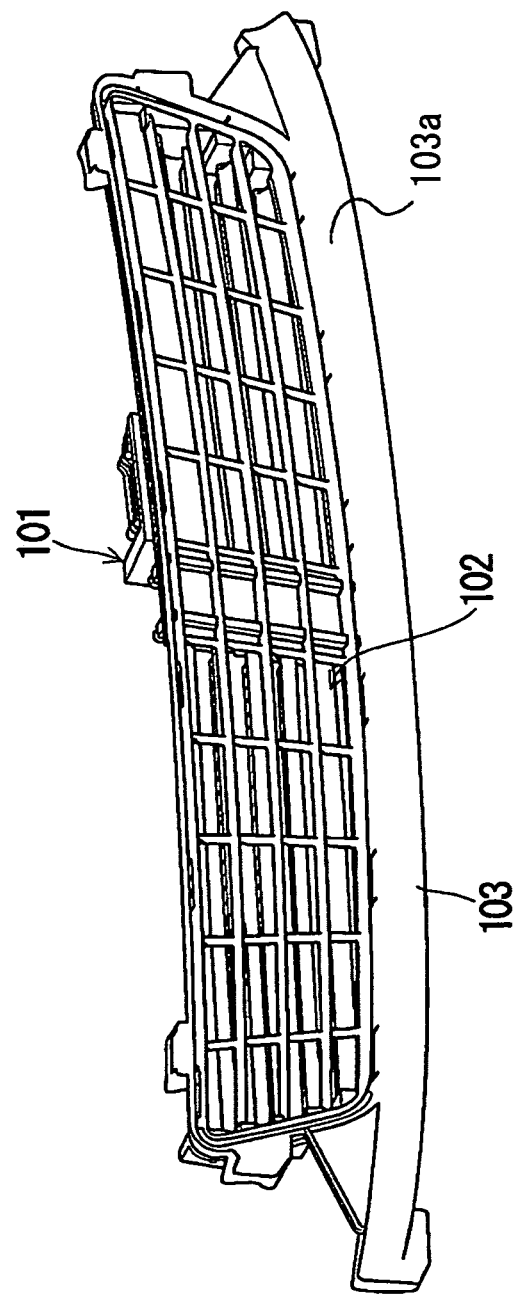

As shown in FIG. 8, a grille shutter 101 of a second embodiment is structured so as to be gently curved in a left/right direction (a lengthwise direction) thereof and so as to be integral with a grille frame 103 that constitutes a front under grille. The grille shutter 101 is structured to be mounted on the grille opening portion 6 shown in FIG. 1 for controlling an intake of the ambient air into the radiator. The grille frame 103 is provided with plural openings 102 and, as shown in FIG. 8, a surface of the grille frame 103 constitutes a design surface 103a (i.e., a design member). The design surface 103a is exposed outside the vehicle in a state where the grille shutter 101 is mounted on the grille opening portion 6.

Figure 9:
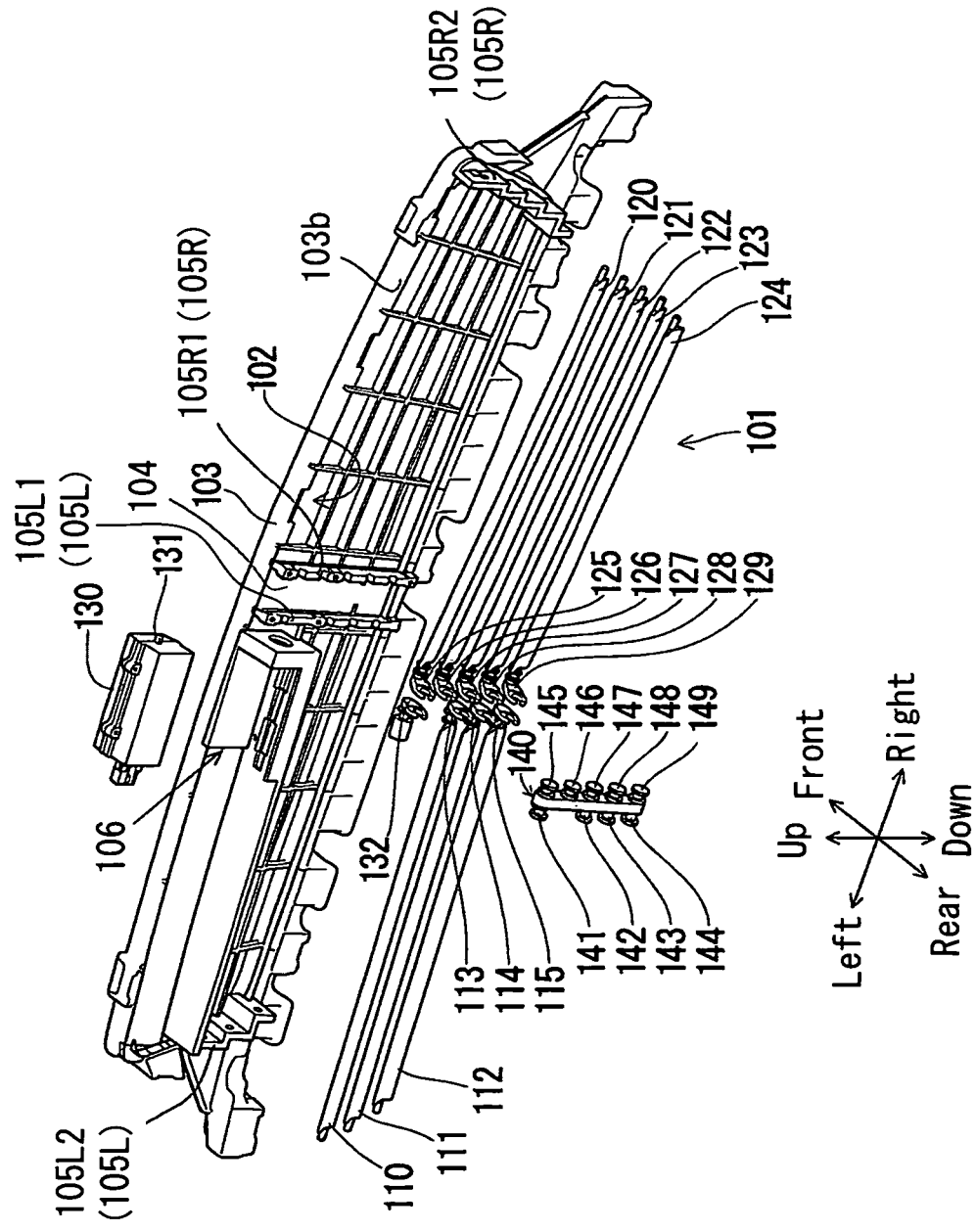
FIG. 9 is an exploded perspective view of the grille shutter related to the second embodiment disclosed here.

As shown in FIG. 9, the grille shutter 101 is constituted by left-side fins 110 to 112 (i.e., the first fins) provided on the left side of the grille frame 103 when viewed in FIG. 9, right-side fins 120 to 124 (i.e., the second fins) provided on the right side of the grille frame 103 when viewed in FIG. 9, a motor 130 (i.e., the driving source) provided above the left-side fin 110 and a rod 140 provided between the left-side fins 110 to 112 and the right-side fins 120 to 124.

As shown in FIG. 9, a rod mounting portion 104 on which the rod 140 is mounted is provided at a substantially center of a reverse surface (a back surface) 103b of the design surface 103a of the grille frame 103. Supporting portions 105L and 105R (i.e., a left-side supporting portion 105L and a right-side supporting portion 105R) are provided at the left side and the right side of the reverse surface 103b relative to the rod mounting portion 104 respectively in a manner that the supporting portions 105L and 105R stand in a substantially vertical direction. The left-side supporting portion 105L includes a left-side first supporting portion 105L1 and a left-side second supporting portion 105L2. The left-side second supporting portion 105L2 is formed with holes supporting therein the left-side fins 110 to 112 respectively. The left-side supporting portion 105L supports the left-side fins 110 to 112 in a manner that the left-side fins 110 to 112 are pivotable about centers of the holes supporting the left-side fins 110 to 112, respectively. The right-side second supporting portion 105R2 is formed with holes supporting therein the right-side fins 120 to 124 respectively. The right-side supporting portion 105R supports the right-side fins 120 to 124 in a manner that the right-side fins 120 to 124 are pivotable about centers of the holes supporting the right-side fins 120 to 124, respectively. The left-side first supporting portion 105L1 is provided close to the rod mounting portion 104 (to the left of the rod mounting portion 104 when viewed in FIG. 9) and supports a first end of each of the left-side fins 110 to 112 in a pivotable manner in a state where the left-side fins 110 to 112 are arranged parallel to one another in the vertical direction. The left-side second supporting portion 105L2 is provided at one end portion (the left-side end portion when viewed in FIG. 9) of the grille frame 103 and supports a second end of each of the left-side fins 110 to 112 in the pivotable manner. In a similar manner to that explained above, the right-side first supporting portion 105R1 is provided close to the rod mounting portion 104 (to the right of the rod mounting portion 104 when viewed in FIG. 9) and supports a first end of each of the right-side fins 120 to 124 in a pivotable manner in a state where the right-side fins 120 to 124 are arranged parallel to one another in the vertical direction. The right-side second supporting portion 105R2 is provided at the other end portion (the right-side end portion when viewed in FIG. 9) of the grille frame 103 and supports a second end of each of the right-side fins 120 to 124 in the pivotable manner. Thus, the left-side supporting portion 105L and the right-side supporting portion 105R function as bearing members of the left-side fins 110 to 112 and the right-side fins 120 to 124 respectively.

The left-side fins 110 to 112 are attached to the left-side supporting portion 105L so as to follow the curved surface of a left-side portion of the grille frame 103 in a manner that the left-side fins 110 to 112 are allowed to be driven to open and close the grille opening portion 6, that is, to be driven to pivot. Left-side arms 113 to 115 (i.e., first arms, the universal joints) are provided at the first end of the left-side fins 110 to 112 so as to pivot integrally with the left-side fins 110 to 112.

The right-side fins 120 to 124 are attached to the right-side supporting portion 105R so as to follow the curved surface of a right-side portion of the grille frame 103 in a manner that the right-side fins 120 to 124 are allowed to be driven to open and close the grille opening portion 6, that is, to be driven to pivot. Right-side arms 125 to 129 (i.e., second arms, the universal joints) are provided at a first end of the right-side fins 120 to 124 so as to pivot integrally with the left-side fins 120 to 124.

A motor mounting portion 106 serving as a driving source mounting portion is provided on the reverse surface 103b of the grille frame 103. The motor mounting portion 106 is provided to be positioned above the left-side fins 110 to 112 mounted on the grille frame 103. The motor 130 is mounted on the motor mounting portion 106 so as to follow the curved surface of the left-side portion of the grille frame 103 in a manner that an output shaft 131 of the motor 130 faces the rod 140. The output shaft 131 is provided with a driving arm 132 (i.e., the universal joint) that pivots integrally with the output shaft 131.

The rod 140 is provided with a driving shaft 141 (i.e., the universal joint) engaging with the driving arm 132, the left-side shafts 142 to 144 (i.e., the universal joints) engaging with the left-side arms 113 to 115, and the right-side shafts 145 to 149 (i.e., the universal joints) engaging with the right-side arm 125 to 129. The driving shaft 141 and the left-side shafts 142 to 144, and the right-side shafts 145 to 149 are provided in a manner that an angle A (i.e., a predetermined angle) is formed between the driving shaft 141 and the left-side shafts 142 to 144, and the right-side shafts 145 to 149. Thus, the driving shaft 141 and the left-side shafts 142 to 144, and the right-side shafts 145 to 149 (see FIG. 11) are arranged so as to follow the curved surface of the grille frame 103 (refer to FIGS. 11 and 12).

Figure 10:
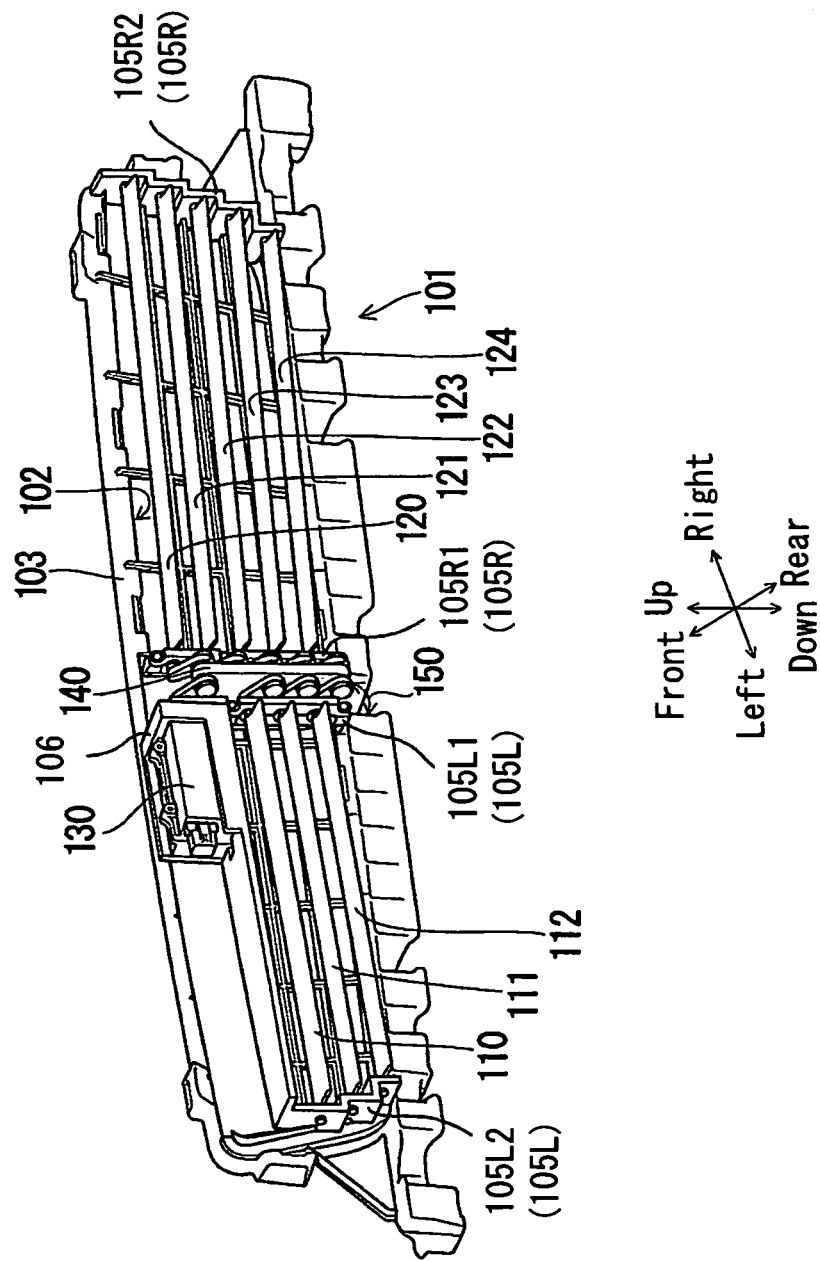
FIG. 10 is a perspective view of the grille shutter related to the second embodiment disclosed here.

As shown in FIG. 10, the left-side fins 110 to 112 are assembled on the left-side portion of the grille frame 103 in the pivotable manner. The left-side arms 113 to 115 engage with the left-side shafts 142 to 144 of the rod 140 in the pivotable manner. The right-side fins 120 to 124 are assembled on the right-side portion of the grille frame 103 in the pivotable manner. The right-side arms 125 to 129 engage with the right-side shafts 145 to 149 of the rod 140 in the pivotable manner. The motor 130 is mounted on the motor mounting portion 106 provided above the left-side fin 110 assembled on the left-side portion of the grille frame 130. The driving arm 132 engages with the driving shaft 141 of the rod so as to pivot integrally with the driving shaft 141.

Figure 11:
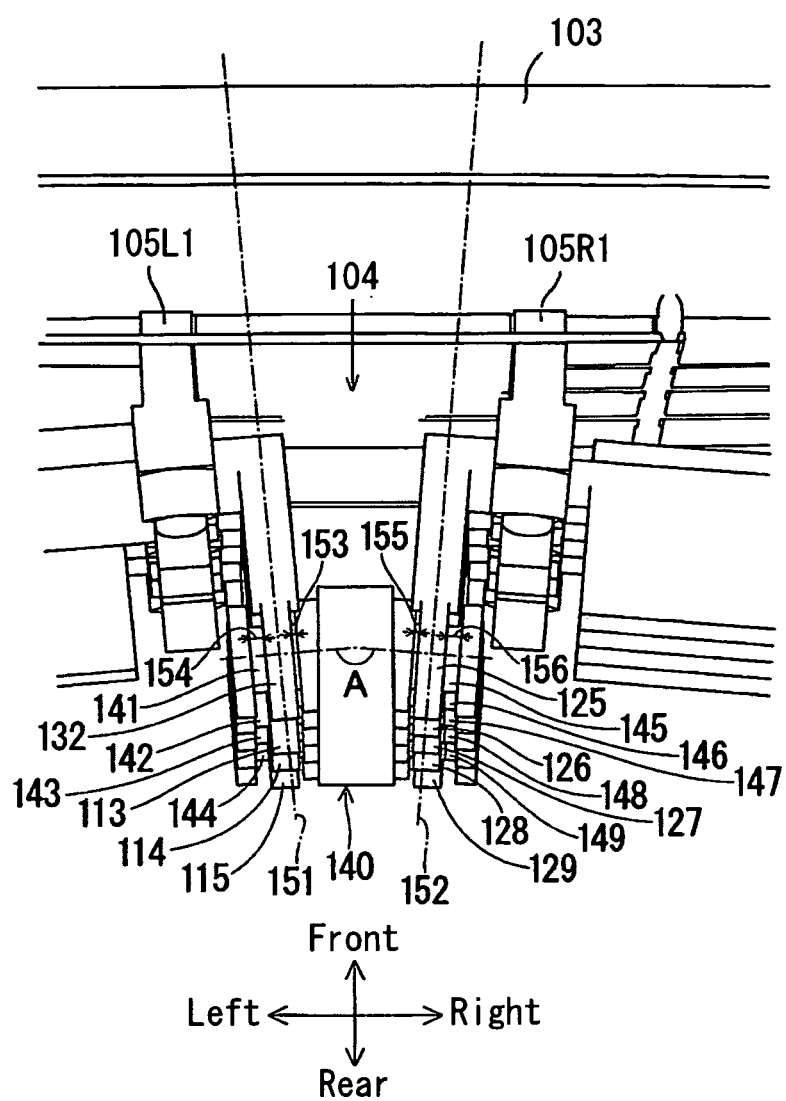
FIG. 11 is a detailed perspective view of engagement portions between left-side arms and left-side shafts, engagement portions between right-side arms and right-side shafts, and an engagement portion between a driving arm and a driving shaft when the grille shutter related to the second embodiment is driven to open.

As shown in FIG. 11, when the grille shutter 101 is driven to open, a clearance 153 and a clearance 154 that is larger than the clearance 153 are formed at an engagement portion between the driving arm 132 and the driving shaft 141 in an axial direction of the driving shaft 141. The clearance 153 is formed to the right of the driving arm 132 and the clearance 154 is formed to the left of the driving arm 132 in the axial direction thereof when viewed in FIG. 11. In the similar way, the clearance 153 and the clearance 154 are also formed at the engagement portion between each of the left-side arms 113 to 115 and each of the left-side shafts 142 to 144. A clearance 155 and a clearance 156 that is larger than the clearance 155 are formed at an engagement portion between each of the right-side arms 125 to 129 and each of the right-side shafts 145 to 149 in an axial direction of the right-side shafts 145 to 149. The clearance 155 is formed to the left of the right-side arms 125 to 129 and the clearance 156 is formed to the right of the right-side arms 125 to 129 in the axial direction thereof when viewed in FIG. 11.

Figure 12:
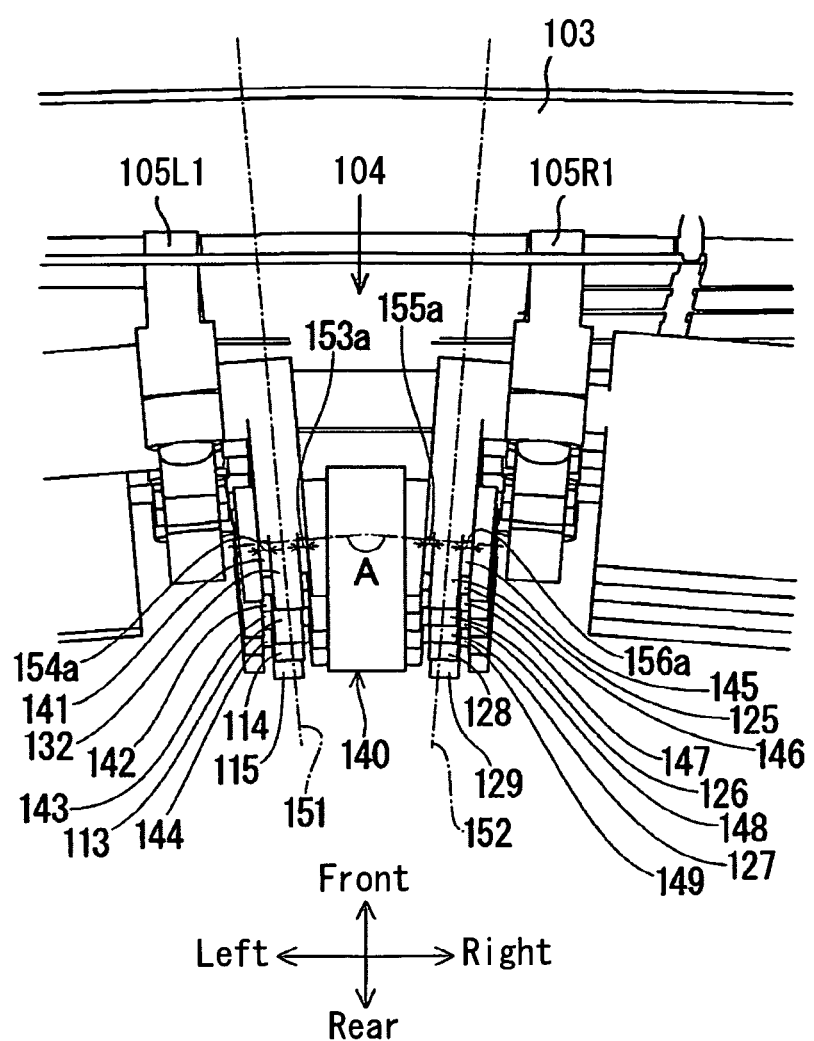
FIG. 12 is a detailed perspective view of the engagement portions between the left-side arms and the left-side shafts, the engagement portions between the right-side arms and the right-side shafts, and the engagement portion between the driving arm and the driving shaft when the grille shutter related to the second embodiment is driven to close.

As shown in FIG. 12, when the grille shutter 101 is driven to close, a clearance 153a and a clearance 154a that is equal to the clearance 153a are formed at the engagement portion between the driving arm 132 and the driving shaft 141 in the axial direction of the driving shaft 141. The clearance 153a is formed to the right of the driving arm 132 and the clearance 154a is formed to the left of the driving arm 132 in the axial direction thereof when viewed in FIG. 12. In the similar way, the clearance 153a and the clearance 154a are also formed at the engagement portion between each of the left-side arms 113 to 115 and each of the left-side shafts 142 to 144. A clearance 155a and a clearance 156a that is equal to the clearance 155a are formed at the engagement portion between each of the right-side arms 125 to 129 and each of the right-side shafts 145 to 149 in the axial direction of the right-side shafts 145 to 149. The clearance 155a is formed to the left of the right-side arms 125 to 129 and the clearance 156a is formed to the right of the right-side arms 125 to 129 in the axial direction thereof when viewed in FIG. 11.

The clearances 153, 155, which are formed when the grille shutter 101 is driven to open the grille opening portion 6, is smaller than the clearances 153a, 155a, which are formed when the grille shutter 101 is driven to close the grille opening portion 6, respectively. The clearances 154, 156, which are formed when the grille shutter 101 is driven to open the grille opening portion 6, is smaller than the clearances 154a, 156a, which are formed when the grille shutter 101 is driven to close the grille opening portion 6.

The operation of the grille shutter 101 will be explained hereunder. When the motor 130 is turned on, the output shaft 131 rotates and the driving arm 132 rotates integrally with the output shaft 131 about a rotation axis of the output shaft 131. As the driving arm 132 rotates, a movement of the driving arm 132 is transmitted to the driving shaft 141 engaging with the driving arm 132, and the rod 140 moves in the vertical and front-rear direction of the vehicle on which the grille shutter 101 is mounted. At this time, the rod 140 creates a trajectory 150 (refer to FIG. 10).

As shown in FIGS. 11 and 12, as the rod 140 moves, the left-side arms 113 to 115 engaging with the left-side shafts 142 to 144 respectively pivot along a first plane that includes trajectories 151 of the left-side arms 113 to 115. The driving arm 132 engaging with the driving shaft 141 also pivots along the first plane. The right-side arms 125 to 129 engaging with the right-side shafts 145 to 149 of the rod 140 respectively pivot along a second plane that includes trajectories 152 of the right-side arms 125 to 129 and that is different or separate from the first plane which includes the trajectories 151 of the left-side arms 113 to 115.

As the grille shutter 101 is driven to close the grille opening portion 6, the clearances 153 and 154, which are formed between the driving arm 132 and the driving shaft 141 and between the left-side arms 113 to 115 and the left-side shafts 142 to 144, change to the clearances 153a and 154a respectively. In a similar manner to that explained above, as the grille shutter 101 is driven to close the grille opening portion 6, the clearances 155 and 156, which are formed between the right-side arms 125 to 129 and the right-side shaft 145 to 149 change to the clearances 155a and 155a respectively.

A relative positional relation between the driving arm 132 and the left-side fins 110 to 112, and the right-side fins 120 to 124 changes because the left-side arms 113 to 115 pivot on the first plane and the right-side arms 125 to 129 pivot on the second plane that is different or separate from the first plane. Thus, the clearances 153 and 154 are provided between the driving arm 132 and the driving shaft 141 and between the left-side arms 113 to 115 and the left-side shafts 142 to 144, and the clearances 155 and 156 are provided between the right-side arms 125 to 129 and the right-side shafts 145 to 149. Consequently, changes in the relative positional relation are absorbed.

According to the grille shutter 101 of the second embodiment, the rod 140 is provided between the left-side fins 110 to 112 and the right-side fins 120 to 124. The left-side arms 113 to 115 and the left-side shafts 142 to 144 are provided between the left-side fins 110 to 112 and the rod 140 in a manner that the clearances 153 and 154 are formed at the engagement portion between the driving arm 132 and the driving shaft 141. The right-side arms 125 to 129 and the right-side shafts 145 to 149 are provided between the right-side fins 120 to 124 and the rod 140 in a manner that the clearances 155 and 156 are formed at the engagement portion between the right-side arms 125 to 129 and the right-side shafts 145 to 149. Thus, even in case that the left-side fins 110 to 112 and the right-side fins 120 to 124 are provided in a manner that the angle A is formed therebetween so that the left-side fins 110 to 112 and the right-side fins 120 to 124 are arranged to follow the curved surface of the grille frame 103, changes in the angle A are absorbed by the clearances 153 to 156. Consequently, the left-side fins 110 to 112 and the right-side fins 120 to 124 are driven to open and close the grille opening portion 6 in synchronization with each other. In the second embodiment, the driving arm 132 and the driving shaft 141 serve as the universal joint or the universal coupling, the left-side arms 113 to 115 and the left-side shafts 142 to 144 serve as the universal joint or the universal coupling, and the right-side arms 125 to 129 and the right-side shafts 145 to 149 serve as the universal joint or the universal coupling. The universal joints or the universal coupling transmit the driving force from the output shaft 131 of the driving source 130 to the left-side fins 110 to 112 and to the right-side fins 120 to 124 that are arranged so as to form the angle A therebetween. In other words, the driving force is transmitted to the left-side fins 110 to 112, and to the right-side fins 120 to 124 whose pivot axes intersect with the pivot axes of the left-side fins 110 to 112 in a manner that the left-side fins 110 to 112 and the right-side fins 120 to 124 are driven to open and close the grille opening portion 6 in synchronization with each other. This is achieved by allowing the universal joints to have a flexibility related to a direction of transmitting the driving force in the axial direction of the driving shaft 141, the left-side shafts 142 to 144, the left-side shafts 145 to 149 by forming the clearances 153, 154, 155, 155, 153a, 154a, 155a, 156a. As the grille shutter 101 is driven to close the grille opening portion 6, the clearances 153, 154, 155, 156 change to the clearances 153a, 154a, 155a, 156a respectively, and thus the changes in the angle A are absorbed. Accordingly, the grille shutter 101 may be configured and arranged so as to match the shape of the grille opening portion 6, and thus the grille shutter 101 that may be mounted on a front portion of the vehicle with an improved degree of freedom is provided. In addition, the dead space in the front portion of the vehicle is reduced, the space that may be used for the purpose of the pedestrian protection or as the crushable zone is ensured, which improves safety and, at the same time, a fuel efficiency is improved. In addition, as the degree of freedom in the mounting of the movable grille shutter improves, the vehicle body is designed with consideration of the aerodynamic performance, which enhances the aerodynamic performance of the vehicle.

In addition, the motor 130 includes the driving arm 132, and the rod 140 includes the driving shaft 141 that engages with the driving arm 132 in a manner that the clearances 153 and 154 are formed at the engagement portion between the driving arm 132 and the driving shaft 141. Thus, a degree of freedom related to mounting angle and position of the motor 130 improves.

According to the grille shutter 101 of the second embodiment, the left-side fins 110 to 112, the right-side fins 120 to 124 and the motor 130 are provided directly at the grille frame 103, thereby eliminating the need for the base frame 7, which is explained in the first embodiment, and thus a number of parts used may be reduced. In addition, the dead space in the front portion of the vehicle may be further reduced. In the second embodiment of this disclosure, however, a member that is equivalent to the base frame 7 may be used in a similar manner to the first embodiment so that the grille shutter 101 and the grille frame 103 are configured separately from each other.

According to the grille shutter 101 of the second embodiment, the left-side fins 110 to 112 include three fins and the right-side fins 120 to 124 include five fins, however, a number of fins is not limited thereto. The grille shutter 101 may include at least one left-side fin and at least one right-side fin.

The angle A is appropriately set, that is, predetermined, for each vehicle so that the degree of freedom in the mounting of the grille shutter 101 on the front portion of the vehicle is improved.

According to the first and second embodiments, the grille shutter 1, 101, which is provided at the grille opening portion 6 through which the ambient air is taken into the engine room, includes the first fin 11, the third fin 13, the left-side fins 110 to 112. The grille shutter 1, 101 also includes the second fin 12, the fourth fin 14, the right-side fins 120 to 124 which are provided along the lengthwise direction of the first fin 11, the third fin 13, the left-side fins 110 to 112 in a manner that the angle A is formed between the first fin 11 and the second fin 12, between the third fin 13 and the fourth fin 14, and between the left-side fins 110 to 112 and the right-side fins 120 to 124 respectively in a manner that the first fin 11 and the second fin 12, the third fin 13 and the fourth fin 14, and the left-side fins 110 to 112 and the right-side fins 120 to 124 are arranged to match the shape of the grille opening portion 6. The grille shutter 1, 101 also includes the actuator 15 or the motor 130 for driving the first fin 11, the third fin 13, the left-side fins 110 to 112 and the second fin 12, the fourth fin 14, the right-side fins 120 to 124 for opening and closing the grille opening portion 6. The grille shutter 1 includes the first universal joint 51, the second universal joint 52, the third universal joint and the fourth universal joint which are provided between the first fin 11 and the second fin 12 and between the third fin 13 and the fourth fin 14 respectively for transmitting the driving force from the actuator 15 to the first fin 11, the third fin 13, the second fin 12 and the fourth fin 14. The grille shutter 101 includes the driving arm 132, the left-side arms 113 to 115, the right-side arms 125 to 129, the driving shaft 141, the left-side shafts 142 to 144 and the right-side shafts 145 to 149 which are provided between the left-side fins 110 to 112 and the right-side fins 120 to 124 for transmitting the driving force from the motor 130 to the left-side fins 110 to 112 and the right-side fins 120 to 124.

According to the above described structure, the first universal joint 51 and the second universal joint 52, the third universal joint and the fourth universal joint are provided between the first fin 11 and the second fin 12 and between the third fin 13 and the fourth fin 14 respectively for transmitting the driving force from the actuator 15 to the first fin 11, the third fin 13, the second fin 12 and the fourth fin 14. The driving arm 132, the left-side arms 113 to 115, the right-side arms 125 to 129, the driving shaft 141, the left-side shafts 142 to 144 and the right-side shafts 145 to 149 are provided between the left-side fins 110 to 112 and the right-side fins 120 to 124 for transmitting the driving force from the motor 130 to the left-side fins 110 to 112 and the right-side fins 120 to 124. Thus, the second fin 12, the fourth fin 14, the right-side fins 120 to 124 may be provided along the lengthwise direction of the first fin 11, the third fin 13, the left-side fins 110 to 112 in a manner that the angle A is formed therebetween so that the first fin 11, the third fin 13, the left-side fins 110 to 112 and the second fin 12, the fourth fin 14, the right-side fins 120 to 124 are arranged to match the shape of the grille opening portion 6. Consequently, the dead space is reduced by mounting the grille shutter 1, 101 that are configured so as to match the shape of the body of the vehicle, and the space that may be used for the purpose of the pedestrian protection or as the crushable zone is ensured, which improves safety, while improving the fuel efficiency. In addition, as the degree of freedom in the mounting of the grille shutter 1, 101 improves, the vehicle body is designed with consideration of the aerodynamic performance, which enhances the aerodynamic performance of the vehicle. In addition, the above described structure allows the first fin 11, the third fin 13, the left-side fins 110 to 112 and the second fin 12, the fourth fin 14, the right-side fins 120 to 124 to be attached directly on the grille opening port ion.

According to the first embodiment, the first fin 11 and the third fin 13 include the first supporting shaft 21 and the third supporting shaft 23 respectively, and the second fin 12 and the fourth fin 14 include the second supporting shaft 22 and the fourth supporting shaft 24 respectively. The driving source 15 is provided between the first fin 11 and the third fin 13, and the second fin 12 and the fourth fin 14, and includes the first output shaft 32 and the third output shaft 33 for driving the first fin 11 and the third fin 13 to open and close the grille opening portion 6 and the second output shaft 35 and the fourth output shaft 36 for driving the second fin 12 and the fourth fin 14 to open or close the grille opening portion 6. At least one of between the first supporting shaft 21 and the first output shaft 32 and between the third shaft supporting portion 23 and the third output shaft 33, and between the second supporting shaft 22 and the second output shaft 35 and between the fourth supporting shaft 24 and the fourth output shaft 36 is connected via the first universal joint 51, the third universal joint, the second universal joint 52 or the fourth universal joint respectively.

According to the above described structure, the first fin 11, the third fin 13, and the left-side fins 110 to 112, and the second fin 12, the fourth fin 14, and the right-side fins 120 to 124 are arranged on left and right sides of the vehicle respectively across the actuator 15 or the motor 130 in the tilted state so as to follow or match the shape of a body of the vehicle.

According to the first embodiment, the first universal joint 51 includes the first recessed portion 55 and the first quasi-ellipse protruding portion 54 which fits in the first recessed portion 55. The second universal joint 52 includes the second recessed portion and the second quasi-ellipse protruding portion which fits in the second recessed portion. The third universal joint includes the third recessed portion and the third quasi-ellipse protruding portion 69 which fits in the third recessed portion. The fourth universal joint includes the fourth recessed portion and the fourth quasi-ellipse protruding portion which fits in the fourth recessed portion. The first recessed portion 55 is formed at one end of the first supporting shaft 21. The second recessed portion is formed at one end of the second supporting shaft 22. The third recessed portion 69 is formed at one end of the third supporting shaft 23. The fourth recessed portion is formed at one end of the fourth supporting shaft 24. The first quasi-ellipse protruding portion 54 is formed at one end of the first output shaft 32. The second quasi-ellipse protruding portion is formed at one end of the second output shaft 35. The third quasi-ellipse protruding portion is formed at one end of the third output shaft 33. The fourth quasi-ellipse protruding portion is formed at one end of the fourth output shaft 36. The first upper surface 56, the first lower surface 57 and the first front surface 58 are formed on either one of the respective recessed portion and the respective protruding portion.

According to the above described structure, the first upper surface 56, the first lower surface 57, the first front surface 58 are formed on either one of the recessed portion and the protruding portion. Thus, an intersection angle between the rotation axis of each of the supporting shafts and the rotation axis of each of the output shafts is absorbed.

According to the first and second embodiments, the actuator 15 and the motor 130 include the motor 60, 130.

According to the above described structure, the first fin 11, the third fin 13, the left-side fins 110 to 112 and the second fin 12, the fourth fin 14, the right-side fins 120 to 124 are driven by the actuator 15 or the motor 130 so as to open or close the grille opening portion 6, and thus the grille opening portion 6 is opened and closed automatically.

According to the first embodiment, the first fin 11, the third fin 13, the second fin 12, the fourth fin 14 and the actuator 15 are attached to the base frame 7.

According to the above described structure, the grille shutter 1 is provided in the form of the assembly by assembling the first fin 11, the third fin 13, the second fin 12, the fourth fin 14 and the actuator 15 on the base frame 7, which improves the assembly performance of the grille shutter 1.

According to the first embodiment, the base frame 7 includes the first shaft support portion 25, 26 supporting the first supporting shaft 21, 23 and the second shaft support portion 27, 28 supporting the second supporting shaft 22, 24. The first shaft support portion 25, 26 is positioned offset relative to the axis of the first output shaft 32, 33 and the second shaft supporting portion 27, 28 is positioned offset relative to the axis of the second output shaft 35, 36.

According to the above described structure, the first fin 11 and the second fin 12, and the third fin 13 and the fourth fin 14 are arranged to be offset rearward relative to the axes of the first output shaft 32 and the third output shaft 33 and the axes of the second output shaft 35 and the fourth output shaft 36 so as to form the bent shape respectively. The distance of the offset of the first fin 11 and the second fin 12, and the third fin 13 and the fourth fin 14 corresponds to the distance of the offset of the first fin shaft support portion 25 and the third fin shaft support portion 26, and the second fin shaft support portion 27 and the fourth fin shaft support portion 28.

According to the second embodiment, the grille shutter 101 further includes the rod 140 provided between the left-side fins 110 to 112 and the right-side fins 120 to 124 for causing the left-side fins 110 to 112 and the right-side fins 120 to 124 to open and close the grille opening portion 6 in synchronization with each other by means of the driving force from the motor 130. The left-side arms 113 to 115, the right-side arms 125 to 129, the left-side shafts 142 to 144, the right-side shafts 145 to 149 are provided at least one of between the right-side fins 120 to 124 and the rod 140 and between the right-side fins 120 to 124 and the rod 140.

According to the above described structure, the rod 140 is provided between the left-side fins 110 to 112 and the right-side fins 120 to 124. The left-side arms 113 to 115, the right-side arms 125 to 129, the left-side shafts 142 to 144, the right-side shafts 145 to 149 are provided at least one of between the left-side fins 110 to 112 and the rod 140, and between the right-side fins 120 to 124 and the rod 140. Thus, even in case that the left-side fins 110 to 112 and the right-side fins 120 to 124 are provided in a manner that the angle A is formed therebetween so that the left-side fins 110 to 112 and the right-side fins 120 to 124 are arranged to follow the shape of the grille opening portion 6, the left-side fins 110 to 112 and the right-side fins 120 to 124 are driven to open and close the grille opening portion 6 in synchronization with each other by the rod 140 via the left-side arms 113 to 115, the right-side arms 125 to 129, the left-side shafts 142 to 144, the right-side shafts 145 to 149.

According to the second embodiment, the left-side fins 110 to 112 include the left-side arms 113 to 115 and the right-side fins 120 to 124 include the right-side arms 125 to 129. The rod 140 includes the left-side shafts 142 to 144 engaging with the left-side arms 113 to 115 in a manner that the clearance 153, 154, 153a, 154a is formed between the left-side shafts 142 to 144 and the left-side arms 113 to 115, the right-side shafts 145 to 149 engaging with the right-side arms 125 to 129 in a manner that the clearance 155, 156, 155a, 156a is formed between the right-side shafts 145 to 149 and the right-side arms 125 to 129 and the angle A is formed between the left-side fins 110 to 112 and the left-side fins 120 to 124. The universal joint is configured by the left-side arms 113 to 115 and the left-side shafts 142 to 144 or by the right-side arms 125 to 129 and the right-side shafts 145 to 149.

According to the above described structure, the left-side arms 113 to 115 engage with the left-side shafts 142 to 144 in a manner that the clearances 153, 154, 153a, 154a are formed therebetween, and the right-side arms 125 to 129 engage with the right-side shafts 145 to 149 in a manner that the clearances 155, 156, 155a, 156a are formed therebetween. Thus, even in case the locus 151 created by the left-side arms 113 to 115 does not lie on the plane on which the locus 152 created by the right-side arms 125 to 129 lies, the left-side fins 110 to 112 and the right-side fins 120 to 124 are driven to open the grille opening portion 6 in synchronization with each other because the clearances 153, 154, 153a, 154a, 155, 156, 155a, 156a absorb the changes in the angle A.

According to the second embodiment, the motor 130 includes the driving arm 132, the rod 140 includes the driving shaft 141 engaging with the driving arm 132 in a manner that the clearance 153, 154, 153a, 154a is formed between the driving shaft 141 and the driving arm 132, and the universal joint is configured by the driving arm 132 and the driving shaft 141.

According to the above described structure, the motor 130 includes the driving arm 132 and the rod 140 includes the driving shaft 41 engaging with the driving arm 132 in a manner that the clearances 153, 154, 153a, 154a are formed therebetween. Thus, the degree of freedom related to the mounting angle and position of the motor 130 improves.

According to the second embodiment, the grille shutter 101 is structured integrally with the grille frame 103 included in the design surface 103a of the vehicle. The grille frame 103 includes the supporting portions 105L and 105R supporting the left-side fins 110 to 112 and the right-side fins 120 to 124 in a pivotable manner and the motor mounting portion 106 on which the motor 130 is mounted.

According to the above described structure, the grille frame 103 is provided with the supporting portions 105L and 105R supporting the left-side fins 110 to 112 and the right-side fins 120 to 124, and is provided with the motor mounting portion 106 on which the motor 130 is mounted. This eliminates the need for a member exclusively for supporting or receiving the left-side fins 110 to 112, the left-side fins 110 to 112 or the motor 130, thereby controlling an increase in the number of parts or components used.

The principles, preferred embodiments and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A movable grille shutter for a vehicle, the movable grille shutter provided at a grille opening portion through which ambient air is taken into an engine room, the movable grille shutter, comprising:
 a first fin including a first supporting shaft;
 a second fin including a second supporting shaft and provided along a lengthwise direction of the first fin in a manner that a predetermined angle is formed between the first fin and the second fin in a manner that the first fin and the second fin are arranged to match a shape of the grille opening portion;
 a driving source provided between the first fin and the second fin and including a first output shaft for driving the first fin to open and close the grille opening portion and a second output shaft for driving the second fin to open or close the grille opening portion; and
 a universal joint provided between the first fin and the second fin for transmitting a driving force from the driving source to the first fin and the second fin, wherein:
 the universal joint includes a recessed portion and a protruding portion which fits in the recessed portion,
 the recessed portion includes a first width across flat which is formed at one end of the first supporting shaft to extend along an axial direction of the first supporting shaft and at one of the second supporting shaft to extend along an axial direction of the second supporting shaft,
 the protruding portion includes a second width across flat which is formed at one end of the first output shaft to extend along an axial direction of the first output shaft and at one end of the second output shaft to extend along an axial direction of the second output shaft, and
 at least one of the first width across flat and the second width across flat is formed with a crowned surface.

2. The movable grille shutter for the vehicle according to claim 1, wherein the driving source includes a motor.

3. The movable grille shutter for the vehicle according to claim 1, wherein the first fin, the second fin and the driving source are attached to a base frame.

4. The movable grille shutter for the vehicle according to claim 3, wherein
 the base frame includes a first shaft support portion supporting the first supporting shaft and a second shaft support portion supporting the second supporting shaft, the first shaft support portion being positioned offset relative to an axis of the first output shaft, the second shaft supporting portion being positioned offset relative to an axis of the second output shaft.

5. The movable grille shutter for the vehicle according to claim 1, further comprising:
 a rod provided between the first fin and the second fin for causing the first fin and the second fin to open and close the grille opening portion in synchronization with each other by means of the driving force from the driving source; wherein
 the universal joint is provided at least one of between the first fin and the rod and between the second fin and the rod.

6. The movable grille shutter for the vehicle according to claim 5, wherein
 the first fin includes a first arm,
 the second fin includes a second arm,
 the rod includes a first shaft engaging with the first arm in a manner that a clearance is formed between the first shaft and the first arm, a second shaft engaging with the second arm in a manner that a clearance is formed between the second shaft and the second arm and the predetermined angle is formed between the first fin and the second fin, and
 the universal joint is configured by the first arm and the first shaft or by the second arm and the second shaft.

7. The movable grille shutter for the vehicle according to claim 5, wherein
 the driving source includes a driving arm,
 the rod includes a driving shaft engaging with the driving arm in a manner that a clearance is formed between the driving shaft and the driving arm, and
 the universal joint is configured by the driving arm and the driving shaft.

8. The movable grille shutter for the vehicle according to claim 1, wherein
 the movable grille shutter for the vehicle is structured integrally with a grille frame included in a design member of the vehicle, and
 the grille frame includes a supporting portion supporting the first fin and the second fin in a pivotable manner and a driving source mounting portion on which the driving source is mounted.

\* \* \* \* \*